US006749381B2

(12) United States Patent
Coslovi et al.

(10) Patent No.: US 6,749,381 B2
(45) Date of Patent: Jun. 15, 2004

(54) RETRACTABLE COIL STOP MECHANISM FOR RAILROAD COIL CAR

(75) Inventors: Ilario A. Coslovi, Burlington (CA); Mohammed Al-Kaabi, Hamilton (CA)

(73) Assignee: National Steel Car Limited, Hamilton (CA)

( * ) Notice: Subject to any disclaimer, the term of this patent is extended or adjusted under 35 U.S.C. 154(b) by 0 days.

(21) Appl. No.: 09/981,357

(22) Filed: Oct. 12, 2001

(65) Prior Publication Data

US 2003/0072632 A1 Apr. 17, 2003

(51) Int. Cl.$^7$ ................................................. B60P 7/08
(52) U.S. Cl. ........................... 410/49; 410/47; 410/143; 410/144; 410/150
(58) Field of Search ............................ 410/47, 49, 50, 410/143, 144, 150; 105/355; 248/351

(56) References Cited

U.S. PATENT DOCUMENTS

| | | | |
|---|---|---|---|
| 2,468,101 A | | 4/1949 | Nampa |
| 2,494,404 A | | 1/1950 | Nixon |
| 2,894,462 A | * | 7/1959 | Newcomer et al. |
| 2,958,492 A | | 11/1960 | Maynard |
| 2,971,795 A | | 2/1961 | Winski |
| 2,977,900 A | | 4/1961 | Farrar |

(List continued on next page.)

FOREIGN PATENT DOCUMENTS

| | | |
|---|---|---|
| DE | 3637127 A1 | 8/1987 |
| GB | 2052416 A | 12/1991 |

OTHER PUBLICATIONS

Car and Locomotive Cyclopedia, 1997 Edition, pp. 79–81 and 90, Simmons–Boardman Publishing Corporation, New York, New York, U.S.A.

Car and Locomotive Cyclopedia, 1984 Edition, pp. 95 and 137, Simmons–Boardman Publishing Corporation, New York, New York, U.S.A.

Car and Locomotive Cyclopedia, 1966 Edition, pp. 151 and 285–289, Simmons–Boardman Publishing Corporation, New York, New York, U.S.A.

Car and Locomotive Cyclopedia, 1974 Edition, p. S3–59 to S3–65, Simmons–Boardman Publishing Corporation, New York, New York, U.S.A.

Car and Locomotive Cyclopedia, 1980 Edition, pp. 148, 150, 151 and 154, Simmons–Boardman Publishing Corporation, New York, New York, U.S.A.

Promotional material, Zeftek® Inc., Montgomery, Illinois, U.S.A., date of publication unknown.

Promotional material, Thrall Car, Chicago Heights, Illinois, U.S.A., date of publication unknown.

Photographs of various coil cars, taken on Jan. 15, 1997.

Photograph of coil car, taken on Nov. 6, 1995.

Photograph of coil car, taken on Feb. 6, 1996.

*Primary Examiner*—Stephen Gordon
(74) *Attorney, Agent, or Firm*—Stephen L. Grant; Hahn, Loeser & Parks LLP

(57) ABSTRACT

A coil car has a pair of deep side beams and a trough structure mounted to, and suspended between, the deep side beams for carrying coils. The trough structure may have three parallel, longitudinally extending troughs—a central trough lying between two laterally outboard outer troughs. Each trough is shaped to cradle steel coils, or other similar loads, between its inwardly and downwardly sloping shoulder plates. The car has movable coil stops to discourage longitudinal shifting of loaded coils. Retractable rollers or sliders mounted to a movable coil stop facilitate the repositioning of the coil stop during loading, and the coil stop has a mid-span step and hand grabs to facilitate climbing over the coil stop by personnel walking along the trough structure.

39 Claims, 11 Drawing Sheets

U.S. PATENT DOCUMENTS

| | | |
|---|---|---|
| 2,991,734 A | 7/1961 | Gabriel |
| 3,009,426 A | 11/1961 | Nampa |
| 3,061,255 A | 10/1962 | Gallo et al. |
| 3,186,357 A | 6/1965 | Fillion |
| 3,223,259 A | 12/1965 | Nicholson |
| 3,291,072 A * | 12/1966 | Cunningham |
| 3,291,073 A | 12/1966 | James |
| 3,307,495 A | 3/1967 | Chapman et al. |
| 3,307,497 A | 3/1967 | Chapman et al. |
| 3,353,506 A * | 11/1967 | Snyder et al. |
| 3,376,062 A | 4/1968 | Chosy et al. |
| 3,392,682 A | 7/1968 | Francis |
| 3,413,931 A * | 12/1968 | Augustine, Jr. |
| 3,430,981 A | 3/1969 | Tarantola |
| 3,465,692 A | 9/1969 | Hyatt |
| 3,493,210 A | 2/1970 | Brenner |
| 3,508,503 A | 4/1970 | Daly |
| 3,581,674 A | 6/1971 | O'Leary |
| 3,605,638 A * | 9/1971 | James |
| 3,628,466 A | 12/1971 | Lyons et al. |
| 3,658,011 A | 4/1972 | West et al. |
| 3,658,195 A | 4/1972 | Fantin |
| 3,875,617 A | 4/1975 | Cline |
| 3,912,325 A | 10/1975 | Sudyk |
| 3,922,004 A | 11/1975 | Chamberlain |
| 4,102,274 A | 7/1978 | Feary et al. |
| 4,204,479 A | 5/1980 | Rosa |
| 4,240,773 A | 12/1980 | Terry |
| 4,315,707 A | 2/1982 | Fernbach ............... 410/47 |
| 4,357,048 A | 11/1982 | Zehnder et al. |
| 4,367,059 A | 1/1983 | Stubbins ............... 410/44 |
| 4,451,188 A * | 5/1984 | Smith et al. ........... 410/42 |
| 4,526,500 A | 7/1985 | Patrick ................. 410/48 |
| 4,580,843 A | 4/1986 | Lund |
| 4,686,907 A | 8/1987 | Woollam et al. |
| 4,702,653 A | 10/1987 | Gaulding et al. ........ 410/144 |
| 4,732,528 A | 3/1988 | Good |
| 4,754,709 A | 7/1988 | Gramse et al. |
| 4,782,762 A | 11/1988 | Johnstone et al. |
| 4,805,539 A | 2/1989 | Ferris et al. |
| 4,841,876 A | 6/1989 | Gramse et al. |
| 5,048,885 A | 9/1991 | Bomar |
| 5,085,152 A | 2/1992 | Tylisz et al. |
| 5,170,717 A | 12/1992 | Richmond et al. |
| 5,191,842 A | 3/1993 | Tinkler |
| 5,211,518 A * | 5/1993 | Mimica ................. 410/50 |
| 5,228,823 A | 7/1993 | Crook |
| 5,336,027 A | 8/1994 | Paddock ............... 410/49 |
| 5,341,747 A | 8/1994 | Fetterman et al. |
| 5,343,812 A | 9/1994 | Ishida |
| 5,343,813 A | 9/1994 | Septer |
| 5,373,792 A | 12/1994 | Pileggi et al. |
| 5,401,129 A * | 3/1995 | Eatinger ............... 410/49 |
| 5,425,608 A | 6/1995 | Reitnouer ............. 410/49 |
| 5,476,348 A | 12/1995 | Shelleby .............. 410/49 |
| 5,520,489 A | 5/1996 | Butcher et al. ......... 410/94 |
| 5,538,376 A | 7/1996 | Borda ................. 410/99 |
| 5,562,046 A | 10/1996 | Fetterman et al. |
| 5,564,341 A | 10/1996 | Martin |
| 5,622,116 A | 4/1997 | Carlton |
| 5,765,485 A | 6/1998 | Thoman et al. |
| 5,954,465 A * | 9/1999 | Ellerbush ............. 410/49 |
| 6,077,005 A * | 6/2000 | Westlake .............. 410/49 |
| 6,190,100 B1 | 2/2001 | Mawji ................. 410/49 |

* cited by examiner

Detail A

RETRACTABLE COIL STOP MECHANISM FOR RAILROAD COIL CAR

FIELD OF INVENTION

This invention relates to the field of coil stops for use with railroad cars having troughs for transporting heavy cylindrical objects such as, for example, coils of rolled sheet metal.

BACKGROUND OF THE INVENTION

Railroad coil cars are used to transport coiled materials, most typically coils of steel sheet. Coils can be carried with their coiling axes of rotation (that is, the axes of rotation about which the coils are wound) oriented longitudinally, that is, parallel to the rolling direction of the car. The coils are generally carried in a trough. A coil car may have single, double or triple longitudinally extending troughs in a trough structure. The troughs are generally V-shaped and have inwardly inclined surfaces that support the coil. The trough structure may be mounted on a flat car deck or suspended between two side beams and further supported by a centre sill.

When a coil sits in a trough, the circumference of the coil is tangent to the V at two points such that the coil is prevented from rolling. One railroad requirement has been for a restraining device, called a coil stop, to prevent longitudinal displacement of the loaded coils. Typically, a coil stop is a transversely oriented beam, or movable bulkhead, located in position across the trough after a coil has been loaded. The coil stop extends between the side beams and can be moved to a location near to a seated coil. The coil stop is then releasably, or removably anchored, typically with pins that locate in perforated strips mounted to the side beams. Typically, shims are then inserted between the coil stop and the coil to give a snug fit.

Coils of steel sheet carried in a coil car are generally very heavy. Consequently, coil stops for restraining the longitudinal movement of these coils must be of considerable strength and are typically made of steel. Thus, coil stops may be relatively heavy as well.

The same coil stop may be used for restraining coils of different lengths. This is possible because a coil stop is movable and is repositioned near the end of a seated coil each time the coil is loaded. Repositioning a heavy coil stop by hand inside the trough structure may require considerable manual effort. It would be advantageous to provide a coil stop having features tending to facilitate repositioning more easily from place to place along the trough, or troughs, of the coil car. Resting a coil stop on rollers or sliders may tend to be helpful in this regard.

Although resting a coil stop on rollers or sliders may facilitate repositioning of the coil stop, the weight of the coil stop can cause excessive wear and tear to rollers or sliders supporting the weight. When the railcar moves along a railroad track, any vertical vibration of the railcar is imparted to the coil stop, causing it to tend to vibrate vertically relative to the railcar. The downward load of the coil stop may tend to be delivered to the weight-bearing surface of the railcar through rollers or sliders, which have a relatively concentrated contact area. This concentrated load introduces additional wear to both the weight supporting rollers or sliders attached to the coil stop, and to the weight-bearing surface on the railcar. To reduce this wear, it may be desirable to keep such rollers or sliders in a retracted position so that they are free of contact with the weight-bearing surface when a coil car is in motion, while permitting the weight of the stationary coil stop to be borne by other structure.

Once a coil stop is repositioned near a seated coil, the stationary coil stop may be releasably anchored in position using an engagement strip. Such an engagement strip can be mounted on a side beam to extend laterally inboard of the side beam. It is generally desirable to trim the coil stop engagement strip back to increase the capacity of the trough structure. Horizontal pins may be used to engage a side strip mounted to the side of a side beam. Alternatively vertical pins may be used to engage a horizontal strip placed on the side beam.

Further, the bottom of the trough may provide a walkway space. When the bottom of the trough is used as a walkway, it may be advantageous for the coil stop to be provided with climbing means, such as a step, or stile, and handgrabs.

SUMMARY OF THE INVENTION

In an aspect of the invention, there is a coil stop for a railroad coil car. The coil car has a trough structure in which to carry coils. The trough structure has two sides and a longitudinal dimension. The coil stop has a first member for blocking motion of the coils, a releasable securement fitting connected to the first member, and at least one transport fitting connected to the first member. The first member is repositionable along the trough structure. The securement fitting is operable to locate the first member relative to the trough structure. The transport fitting is movable between a first position and a second position relative to the first member. In the first position, the transport fitting engages the trough structure and supports a greater portion of the weight of the coil stop than in the second position, and the first member has less resistance to longitudinal motion relative to the trough structure than when the transport fitting is in the second position.

In a feature of this aspect of the invention, the transport fitting includes a load bearing member of load bearing members selected from the group consisting of a roller, a slider, a wheel with a bearing, and ball caster. The load bearing member is connected to the first member and is moveable between a first position corresponding to the first position of the transport fitting and a second position corresponding to the second position of the transport fitting. Furthermore, the load bearing member is operable to travel along the trough structure and bears a greater portion of the weight of the coil stop in the first position than in the second position. Optionally, the load bearing member may be a slider, or a roller. In a further feature, the load bearing member is disengaged from the trough structure in the second position.

In an alternative further feature, the transport fitting further includes a cam movably mounted to the first member, an actuator mechanically connected to move the cam, a cam follower mounted to the first member at a pivot point, and an arm connecting the cam follower and the load bearing member. The cam follower is operable to engage the cam and to pivot about the pivot point, the actuator is operable to move the cam, and the cam follower is driven by the actuator to urge the load bearing member to move toward the first position.

In an additional feature, the transport fitting further includes a shaft which has a first end and a second end. The shaft is mounted to the first member. The first end has the cam attached thereto. The actuator is a handle fixed to the shaft. The handle is operable to rotate the shaft to urge the load bearing member to move toward the first position. In a still additional feature, the first member includes a beam member for spanning the trough structure. The beam member has two ends and a medial portion extending between these two ends. A step is mounted to the medial portion of the beam member between the two ends to facilitate climbing of the coil stop.

In a further feature, the step may include a tread plate mounted upon the medial portion of the beam member. In an alternative further feature, a hand grab may be mounted to the medial portion of the beam member adjacent to the step. In a still further feature, the hand grab is the handle fixed to the shaft. In yet another alternative further feature, a pair of hand grabs are mounted to either side of the step. In another feature, the transport fitting is biased by gravity toward the second position. In yet another feature of this aspect of the invention, the transport fitting includes a spring biasing the transport fitting toward the second position. In still another feature of this aspect of the invention, the securement fitting includes at least one indexing member mounted to the first member. The indexing member is engageable to maintain the coil stop in a fixed position relative to the trough structure. In yet another alternative feature of this aspect of the invention, the first member spans the trough structure. The first member has two ends, each of which has a transport fitting connected thereto.

In another aspect of the invention, there is a coil stop for a railroad coil car. The coil car has a trough structure in which to carry coils. The trough structure has two sides and a longitudinal dimension. The coil stop includes a first member for blocking motion of the coils along the trough structure, a releasable securement fitting connected to the first member, operable to locate the first member relative to the trough structure, and at least one transport fitting connected to the first member. The first member is mounted spunwise relative to the trough structure and is repositionable along the trough structure. The transport fitting includes a roller connected to the first member. The roller is movable between a first position and a second position relative to the first member. In the first position the roller is operable to ride longitudinally on the trough structure, and supports a greater portion of weight of the first member when in the first position than when in the second position.

In a feature of this aspect of the invention, the first member spanning the trough structure has two ends, each of which has a transport fitting and a securement fitting connected thereto. In an alternative feature, the transport fitting further includes a cam movably mounted to the first member, an actuator mechanically connected to move the cam, a cam follower mounted to the first member at a pivot point, and an arm connecting the cam follower and the load bearing member. The cam follower is operable to engage the cam and to pivot about the pivot point, the actuator is operable to move the cam, and the cam follower is driven by the actuator to urge the load bearing member to move toward the first position.

In a further feature, the transport fitting further includes a shaft which has a first end and a second end. The shaft is mounted to the first member. The first end has the cam attached thereto. The activator is a handle fixed to the shaft. The handle is operable to rotate the shaft to urge the load bearing member to move toward the first position.

In another further feature, the first member includes a beam member for spanning the trough structure. The beam member has two ends and a medial portion extending between these two ends. A step is mounted to the medial portion of the beam member between the two ends to facilitate climbing over the coil stop. Optionally, the step may include a tread plate mounted upon the medial portion of the beam member. As another option, a hand grab may be mounted to the medial portion of the beam member adjacent to the step, or a pair of hand grabs may be mounted to either side of the step. As a further option, the handle fixed to the shaft may be used as the hand grab.

In another aspect of the invention, there is a combination of a rail road coil car and a coil stop for use in combination therewith. The coil car has a trough structure for carrying coils. The trough structure is supported for rail car trucks for rolling motion along a rail road track. The coil stop is mounted across the trough and has retractable rollers. The retractable rollers is operable to engage the trough structure and to facilitate repositioning of the coil stop along the trough structure.

In a feature of this aspect of the invention, the coil stop has an actuator connected to a first position in which the rollers engage the trough structure. In a further feature, the rollers are biased away from the first position. In a still further feature, the rollers are biased by gravity. In an alternative feature, the coil stop has a releasable securement fitting operable to locate the coil stop in a fixed position relative to the trough structure. In another feature, the coil stop has a mid-span handle connected to move the retractable rollers to an engaged position relative to the trough structure. In a further feature, the coil stop has a step mounted thereon. In a still further feature, the step is mounted adjacent to the handle. In yet another alternative feature of this aspect of the invention, the trough structure has a central walkway extending longitudinally with respect thereto.

In another aspect of the invention, there is a combination of a rail road coil car and a coil stop for use therewith. The coil car has a trough structure in which to carry coils. The trough structure has a first side, a second side and a longitudinal dimension. The coil stop has a first member mounted in a spanning position relative to the trough structure, for blocking motion of the coils along the trough structure. The first member is repositionable along the trough structure. There is a securement fitting operable to locate the first member relative to the structure, a track mounted to the trough structure, and a track following member connected to the first member in the first position. The track extends along the trough structure and is to bear at least a portion of the weight of the coil stop. The track following member is operable to ride on the track, and is movable between a first position and a second position relative to the first member. The track following member supports a greater portion of the weight of the first member when the track following member is in the first position than when the track following member is in the second position. In the first position of the track following member, the coil stop has less resistance to motion along the trough structure than when the track following member is in the second position.

In a feature of this aspect of the invention, the first portion further includes a cam movably mounted to the first member, an actuator mechanically connected to move the cam, a cam follower mounted to the first member at a pivot point and an arm connecting the cam follower and the track following member. The cam follower is operable to engage the cam and to pivot about the pivot point, the actuator is operable to move the cam, and the cam follower is driven by the actuator to urge the track following member to move toward the first position.

In an additional feature, the first portion further includes a shaft. The shaft is mounted to the first member and has a first end and a second end. The first end has the cam attached thereto. The actuator is a handle fixed to the shaft. The handle is operable to rotate the shaft to urge the track following member to move toward the first position.

In yet another aspect of the invention, there is a combination of a rail road coil car and a coil step for use therewith. The coil car has a trough structure in which to carry coils. The trough structure has a first side, a second side and a longitudinal dimension. The coil stop has a beam member spanning the trough structure, and is repositionable along the trough structure to obstruct motion of coils along the trough structure. There are a first trackway and a second trackway, each trackway mounted on each side of the trough structure for guiding the repositioning of the coil stop. The beam member has two ends and a medial portion between these two ends. There are a first pair of rollers and a second pair of rollers. Each pair of rollers is connected to each end of the beam member. The first pair of rollers is movable between a first position and a second position relative to the first trackway. The second pair of rollers is movable relative to the second trackway between a first position corresponding to the first position of the first pair of rollers and a second position corresponding to the second position of the first pair of rollers. In the first position, the first pair of rollers is operable to travel along the first trackway and to bear a greater portion of weight of the beam member than when the first pair of rollers is in the second position, and the second pair of rollers is operable to travel along the second trackway and to bear a greater portion of weight of the beam member than in the second position. There is a shaft having a first end and a second end. The shaft extends between the two ends of the beam member and is rotatably mounted to the beam member. There are a first cam attached to the first end of the shaft and a second cam attached to the second end of the shaft. There are a first pair of cam followers mounted to the beam member and operable to engage the first cam and a second pair of cam followers mounted to the beam member and operable to engage the second cam. Additionally, there are a first pair of arms connecting the first pair of cam followers to the first pair of rollers and a second pair of arms connecting the second pair of cam followers to the second pair of rollers. The first pair of arms is operable to urge the first pair of rollers to move between the first and second positions, and the second pair of arms is operable to urge the second pair of rollers to move between the first and second positions. There is also a handle fixed to the shaft. The handle is operable to rotate the shaft to urge the rollers to move between the first and second positions. Finally, there are a pair of first indexing members mounted to the first and second ends of the beam member and a pair of second indexing members mounted to the first and second sides of the trough structure. The indexing members are cooperable to maintain the beam member in a fixed position relative to the trough structure.

In a feature of this aspect of the invention, there is a step mounted on the medial portion of the beam member between the two ends, whereby to facilitate climbing over the beam member.

BRIEF DESCRIPTION OF THE DRAWINGS

For a better understanding of the present invention and to show more clearly how it may be carried into effect, reference will now be made to the exemplary embodiments illustrated in the accompanying drawings, which show the apparatus according to the present invention and in which.

DETAILED DESCRIPTION OF THE INVENTION

Figure 1:
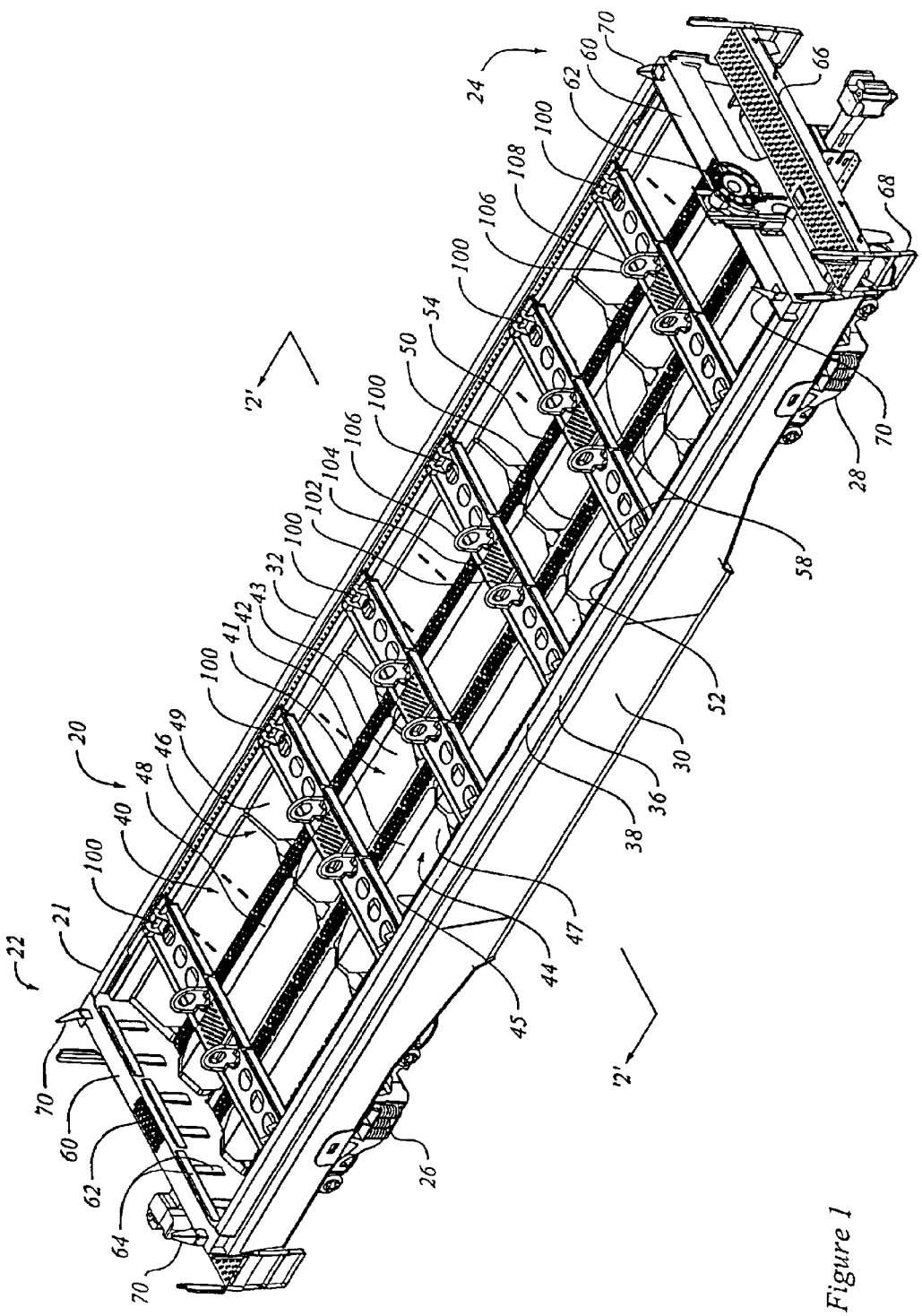
FIG. 1 shows an isometric view of a coil car.

The description that follows, and the embodiments described therein, are provided by way of illustration of an example, or examples of particular embodiments of the principles of the present invention. These examples are provided for the purposes of explanation, and not of limitation, of those principles and of the invention. In the description that follows, like parts are marked throughout the specification and the drawings with the same respective reference numerals. The drawings are not necessarily to scale and in some instances proportions may have been exaggerated in order more clearly to depict certain features of the invention.

In terms of general orientation and directional nomenclature, the longitudinal direction of a coil car is defined as being coincident with the rolling direction of the car, or car unit, when located on tangent (that is, straight) track. This is in the same direction as the centreline of the railroad car, indicated as axis CL. The term "lateral," or "laterally outboard," refers to a distance or orientation relative to the longitudinal centreline of the railroad car.

FIG. 1 is an isometric view of a railroad coil car, indicated generally as 20. Railroad coil car 20 has a rail car body 21 supported upon a pair of spaced apart rail car trucks 26, 28, for rolling motion in the longitudinal direction (i.e., along the rails). Rail car body 21 has a pair of spaced apart end sections 22, 24, each carried over one of rail car trucks 26, 28. Side beams 30, 32 extend between end sections 22 and 24 and form the main longitudinal structural elements of coil car 20 for resisting vertical loads. A trough structure for carrying coils, generally indicated as 40 and having a central trough 42 and two outboard troughs 44, 46, is mounted to and suspended between side beams 30 and 32. Trough structure 40 is further supported by a centre sill 34 (shown in FIG. 2). Centre sill 34 is supported by an array of cross-members 31 extending between side beams 30 (or 32, as the case may be) and centre sill 34.

Each of troughs 42, 44, and 46 is shaped to cradle steel coils, or other similar, generally cylindrical coiled loads, between its inwardly and downwardly sloping shoulders, namely sloped plates 41 and 43, 45 and 47, 48 and 49, respectively. These sloped plates form V-shaped troughs. Each of the troughs formed by these sloped plates has a flat valley bottom, forming a walkway. Each of walkways 50, 52, 54 has a tread plate 58 located at the base, that is, the valley bottom, of the particular trough. This geometry defines longitudinally oriented troughs, that is, troughs in which the winding axis of the coils will be parallel to the longitudinal, or rolling, direction of the rail car. Sloped plates 41 and 43, 45 and 47, 48 and 49 are lined with cushioning in the nature of wood decking that acts as a cushion to buffer coils during loading or travel.

Movable cross beam members, namely coil stops 100, extend between side beams 30, 32. Coil stops 100 are releasably secured to, and supported by, side beams 30, 32 and are movable along the side beams, that is, the longitudinal direction of trough structure 40. Although six coil stops are illustrated, this is representative of any reasonable number of coil stops more generally, such as may be appropriate for anticipated loading conditions, and overall maximum car weight when loaded.

Each coil stop has the general form of an I-beam set on its side, the I-beam having a web and two flanges. The web of the I-beam lies in a horizontal plane. A stile, or step, 102 with a roughened tread plate 104 is mounted on the horizontal web. Each coil stop has hand grabs 106 to aid personnel in walking along the valley of central trough 42. Rollers or sliders mounted to each end of a coil stop 100, as will be described in great detail below, aid repositioning the coil stop along side beams 30, 32.

Each of side beams 30, 32 includes a cowling support 36, having an upwardly facing surface 38. Each end section 22 (or 24) has an end bulkhead 60. The upwardly facing surface 38 of cowling support 36 and the corresponding upwardly facing surfaces of end bulkheads 60 define respective longitudinal and transverse edges of a rectangular periphery bounding the trough structure.

Load stabilising partitions in the nature of end bulkheads 60 and moveable bulkheads, namely coil stops 100, discourage longitudinal sliding of coils loaded in troughs 42, 44 and 46. A step with a tread plate 62 is provided near the middle of the upwardly facing surface of each end bulkhead 60, opposite the end of walkway 50 of central trough 42.

A cover guide 70 is mounted toward each end of the upwardly facing surface of each end bulkhead 60. A cover 72 (not shown in FIG. 1), as will be described below, is provided for protecting the lading from weather. Cover guides 70 mounted at each of the ends of end bulkhead 60 aid in locating cover 72. Nylon pads 64, or cushions, are mounted to the inward face of end bulkheads 60 in a position to contact coils carried in the troughs.

Coil car 20 has a pair of end walkways 66, each installed next to end section 22, 24, and a ladder 68 for each end walkway 66. In operation, rail yard personnel can ascend end walkways 66 of car 20 by means of ladders 68 located at the corners of the car. Personnel can step over end bulkhead 60 and walk along walkways 50, 52, 54 provided along any of troughs 42, 44, or 46. In stepping over each coil stop 100 personnel can step on tread plate 104 mounted on coil stop 100 and steady themselves with the assistance of the safety appliances, namely handles 106 having the form of U-shaped, downwardly opening hand rungs 108.

Figure 2:
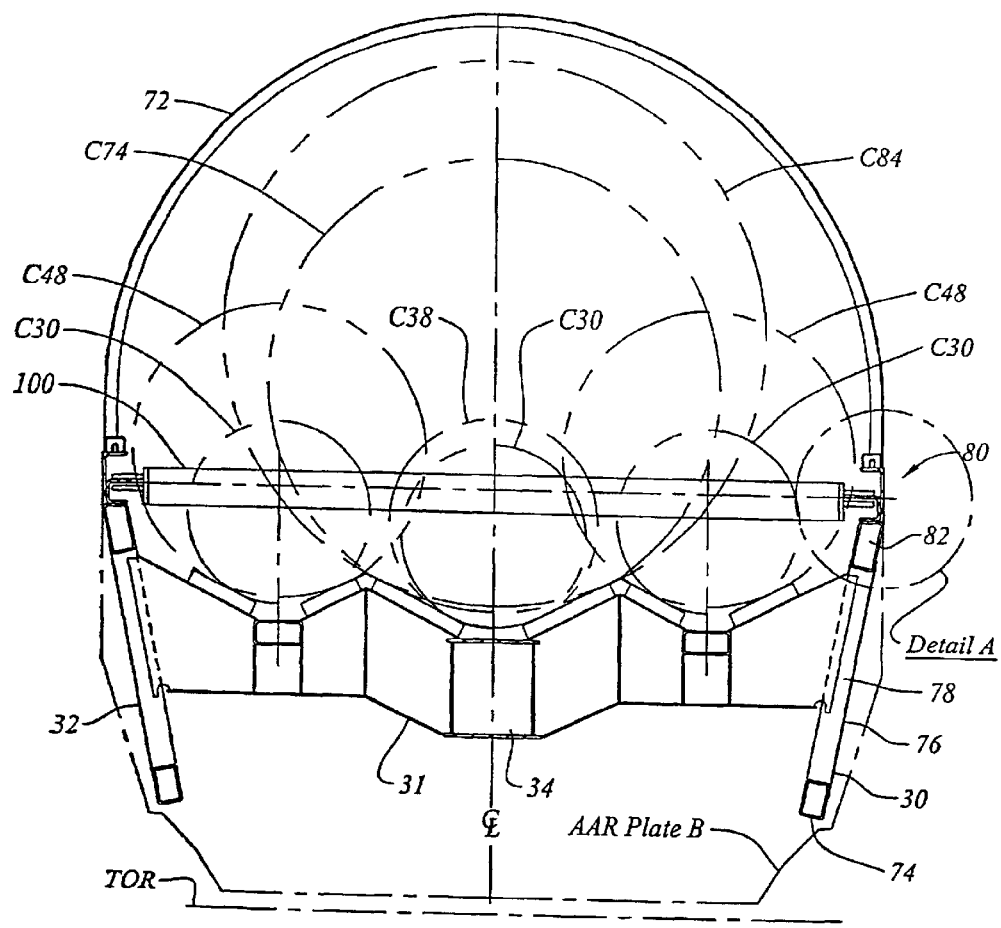
FIG. 2 shows a mid-span cross-sectional view of the coil car of FIG. 1, with coils of various loading configurations shown thereon.

Coil car 20 has a cover, indicated in FIG. 2 as 72, located in place with the aid of cover guides 70 mounted at the corners of the car on end bulkheads 60. Cover 72 is removable to permit loading of coils into the trough structure. The interface surface of the boundary defined by the upwardly facing surfaces 38 of the side beams and end bulkheads 60 matches the footprint of cover 72. Surfaces 38 described above have sufficient width to support cover 72. When cover 72 is installed, the trough structure, walkways and coil stops are carried within the footprint (i.e., within the vertical projection of area) of cover 72, to protect the lading from rain and snow.

Turning now to the description of side beams 30, 32, each side beam 30, 32 has a lower flange assembly 74, an intermediate structure 76 in the nature of webbing 78, and an upper flange assembly 80.

Figure 3:
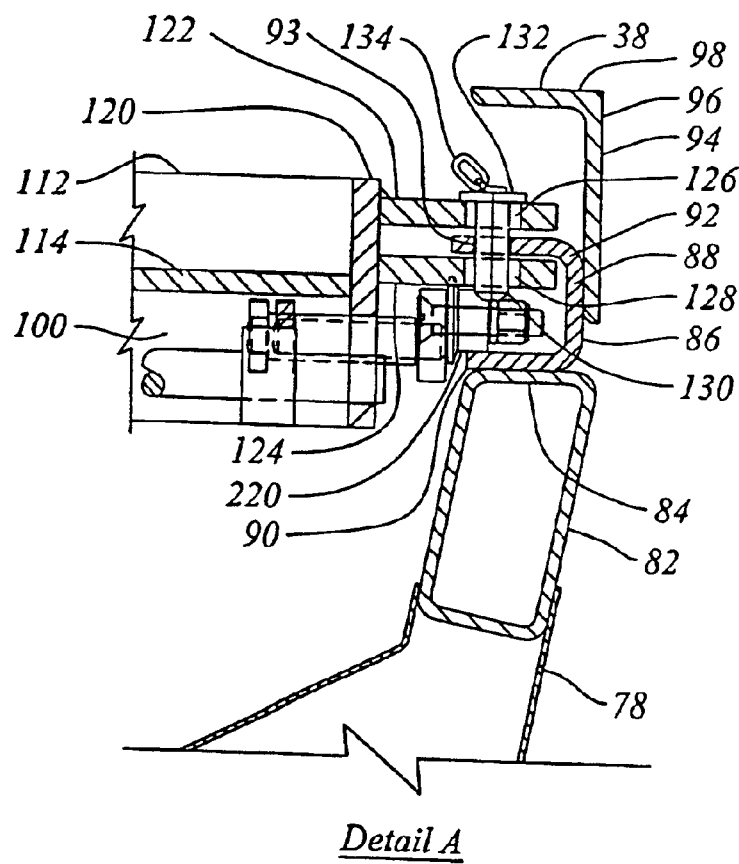
FIG. 3 shows an enlarged cross-sectional detail of an upper flange assembly of a side beam of the coil car of FIG. 1.

As can be seen in the detail drawing of FIG. 3, upper flange assembly 80 includes a trapezoidal hollow tube 82 having inner and outer walls parallel to the slope angle of web sheet 78, and a perpendicular base wall. The top wall 84 of hollow tube 82 is formed to lie in a horizontal plane. An inwardly opening C-shaped formed channel member 86 has a back 88 and parallel legs 90 and 92. Lower leg 90 lies upon, and is welded to, top wall 84 of hollow tube 82, such that back 88 stands in a vertical plane.

A cowling support 36, in the nature of cowling support bracket 94, is welded to back 88. Cowling support bracket 94 has the form of an angle having a relatively tall vertical leg 96 whose toe is welded to the outboard face of back 88 of channel member 86, and a relatively short inwardly extending horizontal leg 98 that extends from the upper end of leg 96 inboard toward the car centreline. The flange formed by horizontal leg 98 has sufficient width (i.e., the length of leg 98 from the angle to the tip of the leg) to form an upwardly facing surface 38 to support coil cover 72 as described above.

Referring to FIGS. 2 and 3, when in a stationary state, movable coil stop 100 is supported by upper leg 92 of upper flange assembly 80. The height of upper leg 92 is such that coil stop 100 is in a position to restrain longitudinal displacement of coils loaded in any of the three troughs. Railroad car 20 with trough structure 40 may be used to carry coils of various sizes in any one of single coil, two-coil, or triple-coil modes. In the single coil mode, a coil up to 84 inches in diameter cradled in the central trough is indicated in dashed lines as C84 in FIG. 2. A 74 inch coil is indicated as C74. Similarly, in a two-coil loading configuration, two coils of up to 48 inches, each accommodated by an outboard trough, are indicated as C48. In a triple-coil configuration, three 30 inch coils, each cradled in a trough, are indicated as C30. Alternatively, a 38 inch coil, indicated as C38, can be accommodated in the central trough while two 30 inch coils are cradled in the outer troughs.

Construction of Coil Stop

Figure 4:
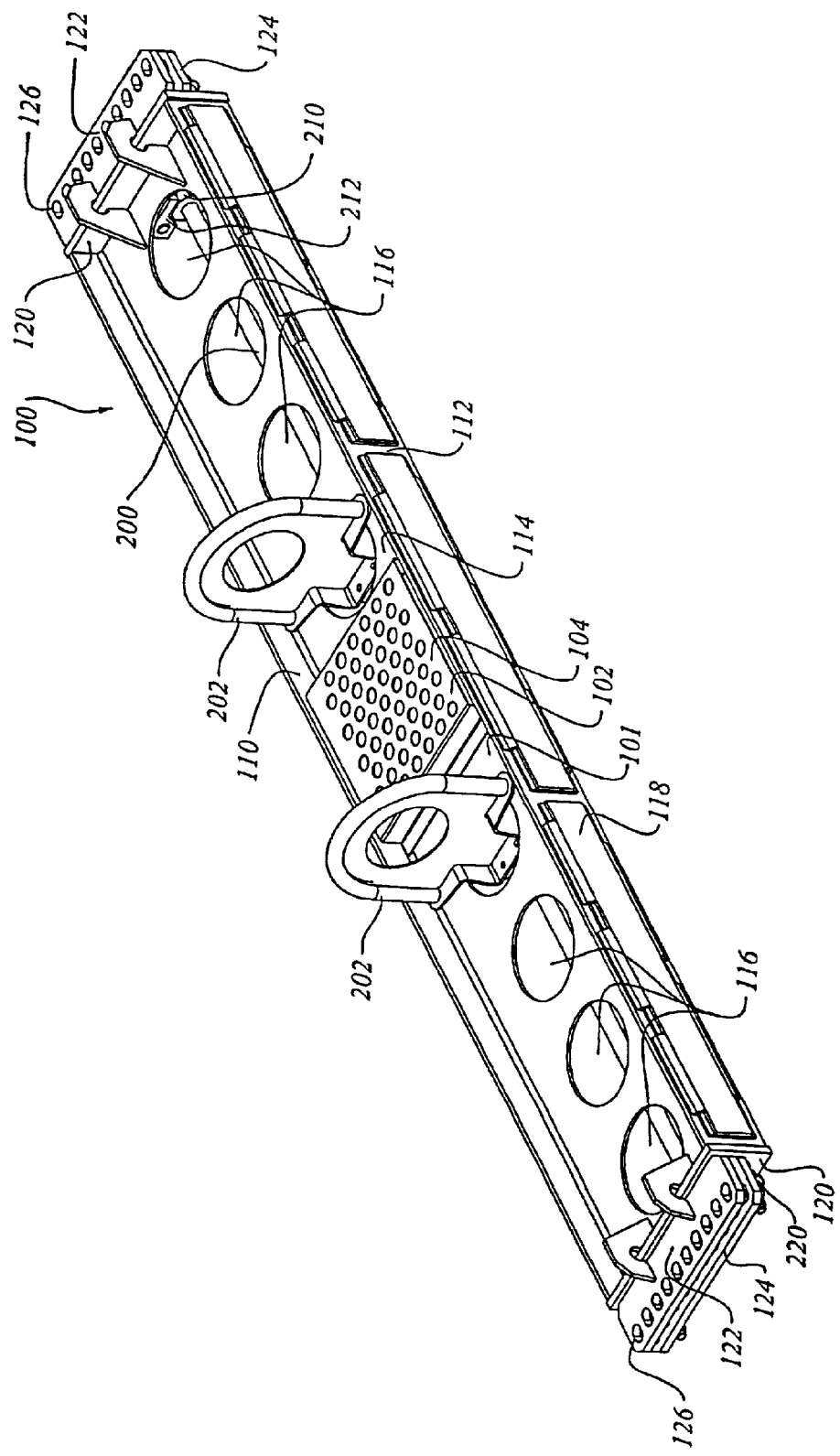
FIG. 4 shows an isometric view of an embodiment of a coil stop for use in the coil car of FIG. 1.

FIG. 4 shows the construction of coil stop 100. It has a cross member 101 in general form of an I-beam having a web and two flanges set on its side. When in use, flanges 110, 112 of the I-beam stand in vertical planes, and web 114 lies in a horizontal plane between the flanges. Nylon pads, or cushions, 118 may be mounted to the outside faces of flanges 110, 112 in a position to contact coils carried in the troughs, and thereby to tend to discourage damage to the edge of the coils. Horizontal web 114 is perforated, having a number of apertures in the nature of round holes 116, formed in it to reduce its weight without unduly reducing its strength. Although eight lightening holes are illustrated, any reasonable number of lightening holes may be formed. A stile, or step, 102 with a roughened tread plate 104 is provided on the upper side of web 114 to aid personnel in stepping over the coil stop. An end plate 120 is welded across each end of the I-beam. End plate 120 may have perforated strips or through holes for securing coil stop 100 to side beams 30, 32 as will be described below. A load bearing component, such as rollers 220 (also shown in FIG. 3) or sliders (not shown), movable between a load bearing position and an inoperative, retracted position, may be mounted to end plates 120 for supporting the weight of coil stop 100 during its repositioning. The construction and operation of load bearing components are described below.

In the embodiment illustrated in FIG. 4, a pair of perforated bars, or strips 122 and 124 are welded to the laterally outboard faces of end plate 120. Perforated strips 122 and 124 stand in parallel horizontal planes and extend outwardly from endplate 120. Referring back to FIG. 3, strips 122 and 124 are spaced apart and carried on end plate 120 at a height to bracket upper leg 92 of formed channel member 86 in a sandwich arrangement.

Figure 5:
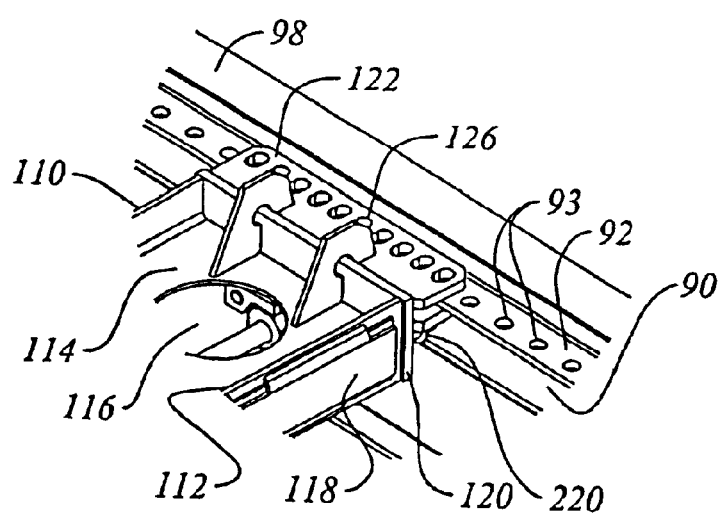
FIG. 5 shows an isometric detail of the engagement of the coil stop shown in FIG. 4 with the upper flange assembly of the coil car of FIG. 1.

FIG. 5 provides an isometric view of the engagement of coil stop 100 with upper flange assembly 80. Strips 122 and 124 have perforations 126 and 128. Perforations 126 and 128 in strips 122 and 124 are aligned with each other. Upper leg 92 has perforations 93 such that a securement or locking member, such as pin 130 as shown in FIG. 3, can be inserted through strip 122, leg 92 and strip 124 for securing coil stop 100 at a position relative to trough structure 40. Perforations 126 and 128 are slots having an oblong shape to permit lateral tolerance in the placement of coil stop 100 relative to side beams 30 and 32 and for accommodating locking pins to engage strips 122 and 124 with matching engagement strips, i.e., upper legs 92, of side beams 30 and 32.

Referring again to FIG. 3, pin 130 has a head 132 of sufficient size to seat on the upper face of strip 122, and a link 134 to which a cable, chain, or similar retraction means such as lanyard 136 (not shown) can be attached. When pin 130 is installed, it is in a double shear condition. Two pins 130 are used at each end of coil stop 100 at any given time.

The pitch of the oval, or oblong, holes, apertures or slots, namely perforations 126, 128 in strips 122 and 124 is slightly different from the pitch of perforations 93 in leg 92 such that a movement of less than a full pitch will cause a different set of holes to align, allowing a finer choice of positions. In the embodiment illustrated in FIG. 5, the pitch of holes in leg 92 is 3 inches. The pitch of the slots in strips 122 and 124 is 1.8 inches. Given a 10 slot arrangement, the different pitches are such that at least 2 sets of slots and holes will line up at every 0.6 inch increment in travel along the leg 92. In this way, perforations 126, 128 in strips 122 and 124, and perforations 93 in strip 92 act as cooperating indexing members. The pitch of one set of indexing members is different from the pitch of the other, such that the effective resolution, or incremented graduation, is less than either pitch by itself.

Figure 6:
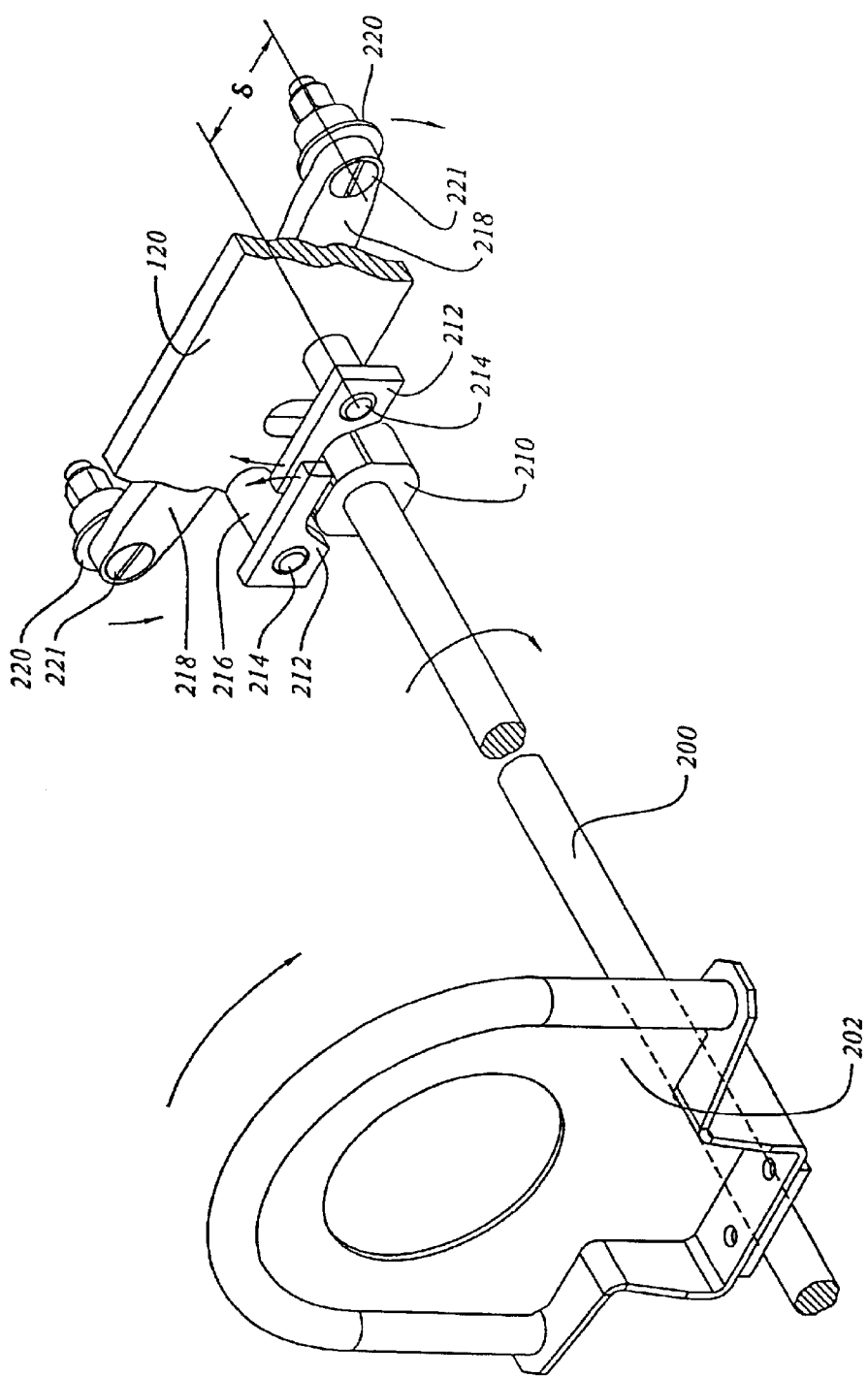
FIG. 6 shows an isometric view of an embodiment of a retractable roller assembly for the coil stop of FIG. 4.

In a preferred embodiment, coil stop 100 has a retractable roller assembly mounted under horizontal web 114 and extending to end plates 120 at both ends. FIG. 6 is an isometric view of a preferred embodiment of a retractable roller assembly. Only half of the assembly is illustrated. The other half, being symmetric about the centre of the assembly, is not shown. The roller assembly has a shaft 200 mounted under horizontal web 114 of coil stop 100 and supported by end plates 120 at both ends of the shaft. At each end, shaft 200 extends outwardly from end plate 120. Handle 202 is mounted by way of bolts to a plate welded to shaft 200 for turning the shaft about its axis. Handle 202 may also be used as handgrab 106 as shown in FIG. 1 for aiding personnel in stepping over the coil stop. Mounted on each end of the shaft and inside the laterally inboard face of end plate 120 is a cam 210. Next to each cam 210, positioned symmetrically about shaft 200 and mounted to the laterally inboard face of endplate 120, are two cam followers 212, engaging cam 210.

Each cam follower 212 is mounted on one end of pivot rod 214. Pivot rod 214 rests in, and extends outwardly from, both ends of a bushing 216 fitted on endplate 120 and may freely rotate about its axis, namely the pivoting axis. An arm, identified as roller mounting plate 218 having two ends, is provided. Roller mounting plate 218 is rigidly attached to the other end of pivot rod 214 such that roller mounting plate 218 and cam follower 212 are constrained to pivot together. Roller 220 is mounted on a stub shaft 221. Stub shaft 221 is mounted to, and extends outwardly from, roller mounting plate 218. The axis of stub shaft 221 is parallel to and offset from the axis of pivot rod 214 by an arm distance indicated as δ.

Deflection of handle 202 transmits a torque through shaft 200 tending to turn it and both cams 210 mounted on the shaft through an angular displacement. Each cam 210 in turn pushes up the tip of each of cam followers 212 mounted next to cam 210, causing each cam follower to pivot about its pivoting axis. Roller mounting plate 218, pivoting together with cam follower 212 and acting as an actuator to transfer the pivot motion to roller 220, in turn lowers roller 220 relative to the beam generally. As handle 202 is deflected, rollers 220 engage the weight bearing surface mounted on side beam 30, 32 to bear at least a portion, if not all, of the weight of coil stop 100.

Handle 202 can be deflected to an angular displacement of about 45 degrees to either side of vertical. In the middle of the range, as when handle 202 is oriented perpendicularly relative to cross member 101 generally, rollers 220 are raised clear of the weight bearing surface. That is, in the central position rollers 220 are free of contact with the weight bearing surface, and as such, do not bear the weight of coil stop 100. As handle 202 is deflected to one side or the other to some angle +/−σ, rollers 220 will come into contact with the weight bearing surface. This range can be defined as the inoperative range in which rollers 220 do not bear the weight of coil stop 100. As handle 202 is pushed (or pulled) past this angular deflection of +/−σ the torque transmitted from the handles through shaft 200 may tend to cause plate 218 to pivot further, such that a portion of the weight of coil stop 100 will then be borne by rollers 220, and coil stop 100 will tend to rise on the retractable roller assembly relative to trough structure 40. An engaged, or load bearing, position can be defined as any position of handle 202 lying in the range of deflection of handles 202 over which rollers 220 bear at least some portion of the weight of cross member 101, namely from deflection +/−σ to the respective ends of the full travel deflection. In one embodiment, the full travel deflection is about +/−45 degrees.

In use, when handle 202 is released, gravity may tend to urge handle 202 back to the +/−σ deflection, that is, back to a non-load bearing position in which the weight of cross member 101 is not borne by rollers 220. That is, handle 202 is biased to a passive, non-load bearing position by gravity.

Optionally, a biasing member such as a spring can be used to bias handle 202, and indeed the entire roller assembly, not only to a non-load bearing position, but also to a position such as the central vertical position in which rollers 220 are raised to be free of contact with the weight bearing surface of side beam 30, 32.

As described above, upper flange assembly 80 has two supporting strips, namely lower leg 90 and upper leg 92. The upper face of lower leg 90 provides a trackway, or weight bearing surface. During the repositioning of coil stop 100, rollers 220 are lowered to engage lower leg 90 in the load bearing position as described above. In such a position, rollers 220 may travel along the trackway. As noted above, strips 122 and 124 and upper leg 92 are positioned in a sandwich arrangement. When rollers 220 are lowered to engage lower leg 90, coil stop 100 is pushed up slightly such that upper leg 92 may bear less weight of the coil stop; or coil stop 100 may be pushed up sufficiently such that upper leg 92 is completely free of contact with upper strip 122 and does not bear any weight of coil stop 100. When upper leg 92 is completely free of contact with upper strip 122, the weight of coil stop 100 may tend to be borne by rollers 220.

The upper surface of upper leg 92, on the other hand, provides a resting platform for coil stop 100 when rollers 220 are retracted. When rollers 220 are in their retracted position, coil stop 100 returns to its lower position such that upper strips 122, welded to end plates 120, rest upon upper legs 92 of upper flange assembly of side beams 30 and 32, bearing at least a portion, if not all, of the weight of the stationary coil stop.

In operation, when coil stop 100 rests at a chosen longitudinal position relative to trough structure 40 (as, for example when positioned next to a coil), the weight of coil stop 100, and, optionally, the biasing influence of a return spring may tend to urge handle 202 away from its deflected position and back toward a generally upright, undeflected position. When handle 202 returns to its upright position, the roller assembly is urged toward its passive, or, retracted position. In other words, rollers 220 are retracted and coil stop 100 rests directly on a weight bearing surface on the side beam. That is, the weight of coil stop 100 is not borne by rollers 220 in the passive condition. To reposition coil stop 100, an operator pushes or pulls handle 202 to turn shaft 200 which in turn lowers rollers 220 to bear the weight of coil stop 100 as described above.

Alternative Embodiments

Figure 7:
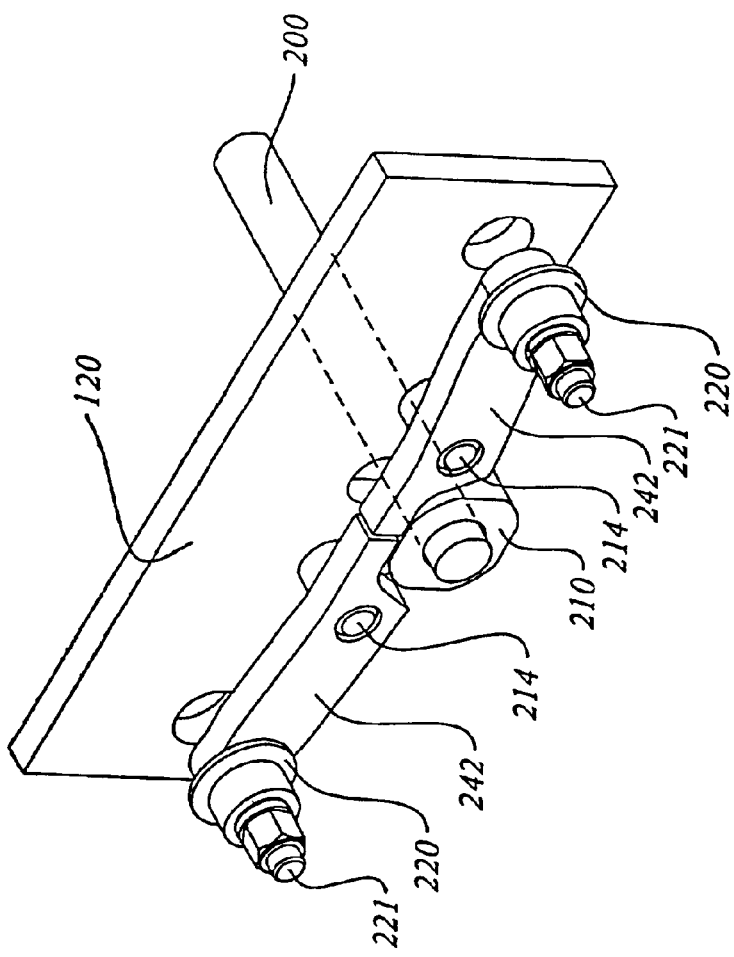
FIG. 7 shows an isometric view of an alternative embodiment of a retractable roller assembly for the coil stop of FIG. 4.

Supporting the weight of coil stop 100 upon rollers 220 may tend to ease significantly the repositioning of coil stop 100. Although in the illustrated embodiment, a separate roller mounting plate 218 is used as an actuator to transfer the pivot motion of cam follower 212 to roller 220, a cam follower 242 with an extended arm for mounting roller 220 as shown in FIG. 7 may be used to transfer the pivot motion of the cam follower to roller 220 directly, i.e., to move the roller between its retracted position and its load bearing position without the aid of an actuator. In an arrangement like this, cam 210 is mounted on an end of the shaft extending outside the laterally outboard face of end plate 120. Two cam followers 242, engaging cam 210, are mounted to the laterally outboard face of endplate 120 and positioned symmetrically about shaft 200.

Figure 8:
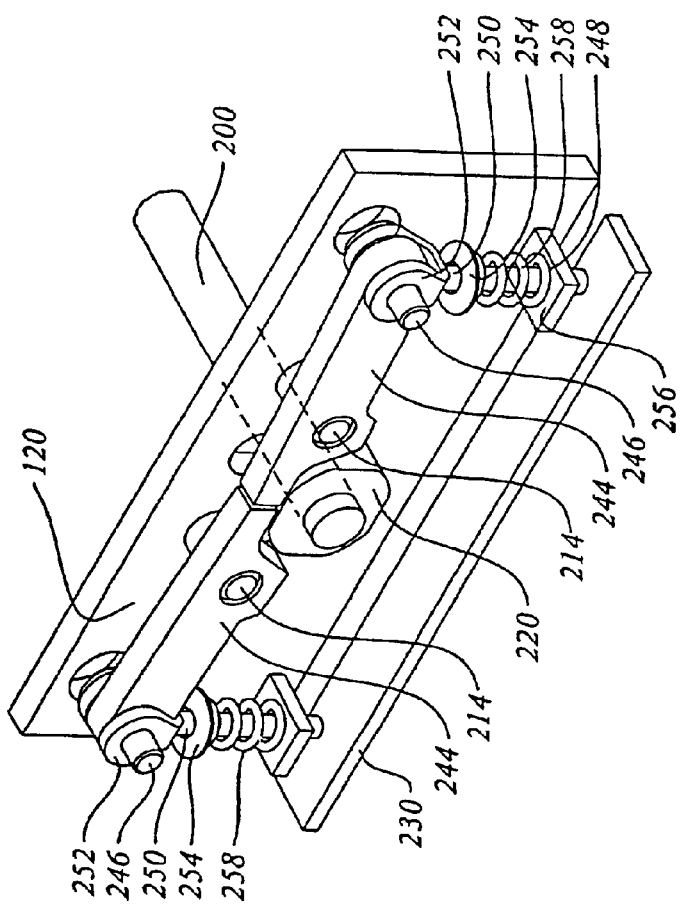
FIG. 8 shows an isometric view of an embodiment of a retractable slider assembly for the coil stop of FIG. 4.

Additionally, although rollers as described above are used as load bearing components of a coil stop for facilitating repositioning of the coil stop, a load bearing component may employ other devices that tend to reduce the resistance to the repositioning of coil stop 100 along the trough structure. Some such alternatives include sliders, wheels with bearings and ball casters. For example, in an alternative embodiment shown in FIG. 8, there is a cam follower 244 having two ends and a through hole in the middle for mounting cam follower 244 to pivot rod 214. One end of cam follower 244 is operable to engage cam 210. The other end of cam follower 244 is connected to an actuator in the nature of a rod 250. Rod 250 has a fork portion 252 connected to cam follower 244 by way of pin 246. Spring base plate 256 is welded to end plate 120 and lies substantially in a horizontal plane. Spring base plate 256 has an aperture 248 defined therein, which allows the passage of rod 250 therethrough. The other end of rod 250 protruded below spring base plate 256 is connected to slider 230. Rod 250 has shoulder 254. Disposed between shoulder 254 and spring base plate 256 and wrapping around rod 250 is a spring 258. Spring 258 tends to bias slider 230 upwardly by pushing shoulder 254 upwards. There is a mirroring cam follower 244 and actuator 250 mechanism arranged on the other side of cam 220, and connected to the other end of slider 230. The downwardly facing surface of slider 230 may have a sliding bearing surface, such as a nylon or high molecular weight polymer pad or facing. In the load bearing position, the downwardly facing surface of slider 230 slides upon and travels along the weight support surface, such as a trackway in the nature of the upper surface of lower leg 90 of the upper flange assembly as described above, mounted to side beams 30, 32.

Additionally, although a trackway is provided in the illustrated embodiment, rollers (or other types of load bearing component) may travel directly upon the outboard sloped plates of trough structure 40, namely outboard plate 45 of outboard trough 44 and outboard plate 49 of outboard trough 46.

Figure 9:
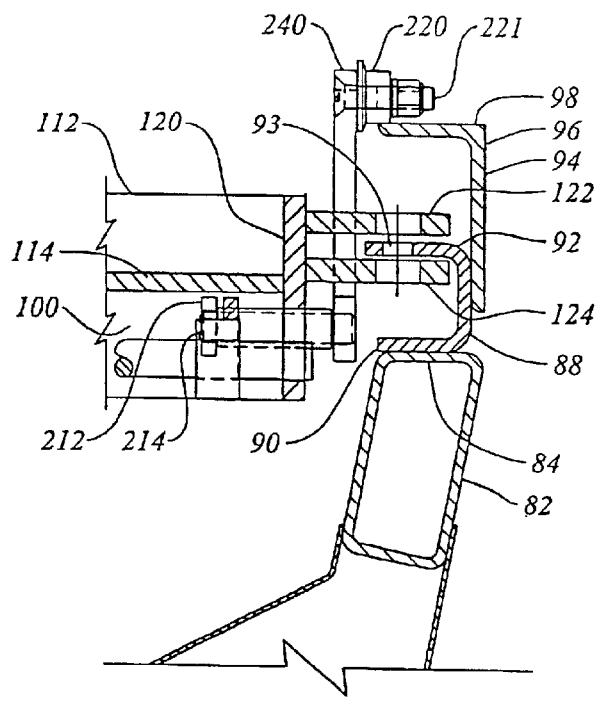
FIG. 9 shows an enlarged cross-sectional detail of an embodiment of a suspended roller assembly for the coil stop of FIG. 4 and a portion of an upper flange assembly of a side beam of the coil car of FIG. 1.
Figure 10:
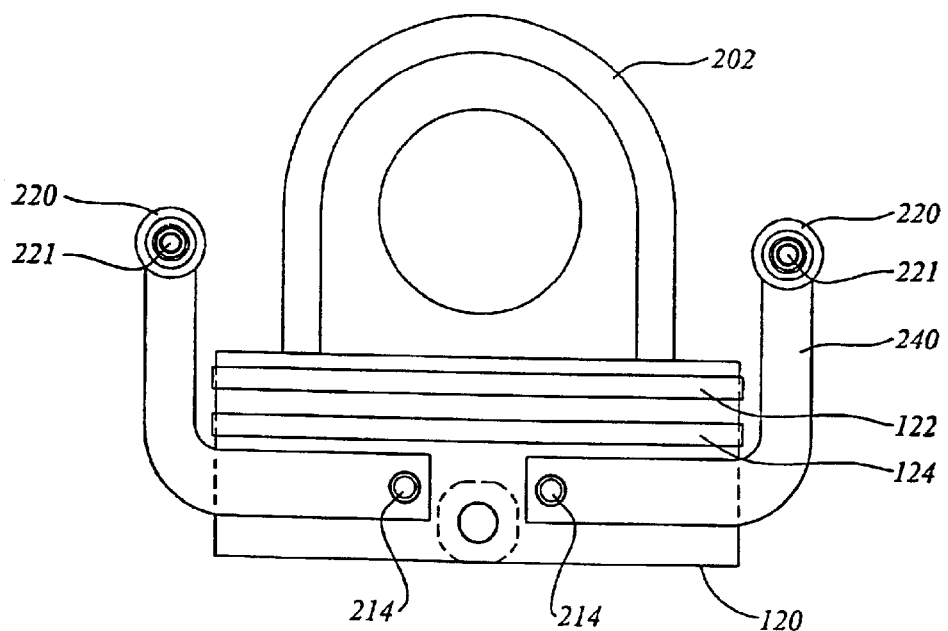
FIG. 10 shows a front view of the mounting plate and roller assembly of FIG. 9.

Furthermore, coil stop 100 may also be suspended from strips supported by rollers 220 that travel on upper surface 38 of horizontal leg 98 of cowling support bracket 94. Referring to FIG. 9 and FIG. 10, roller mounting plate 240 in this embodiment has an extended form so that it does not interfere with strip 124 or 122 in its pivot motion. As before, roller mounting plate 240 attaches to pivot rod 214 and is constrained to pivot together with cam follower 212 mounted to pivot rod 214 on the opposite side of end plate 120. Roller 220 is mounted on stub shaft 221, which is mounted on roller mounting plate 240, extending in the outboard direction. Mounting plate 240 is appropriately sized such that when handle 202 is deflected by about +/−45 degrees from its upright position, roller 220 is lowered to engage upper surface 38 of horizontal leg 98. In this engaged position, coil stop 100 is sufficiently raised such that upper leg 92 is free of contact with both strips 122, 124. When handle 202 returns back to the +/−σ deflection, roller 220 is sufficiently raised to disengage from the upper surface of upper leg 92. Gravity tends to lower coil stop 100 until strip 122 rests upon leg 92. In this position, leg 92 tends to bear a greater portion of weight of coil stop 100 than it does when rollers 220 engage horizontal leg 98.

Figure 11:
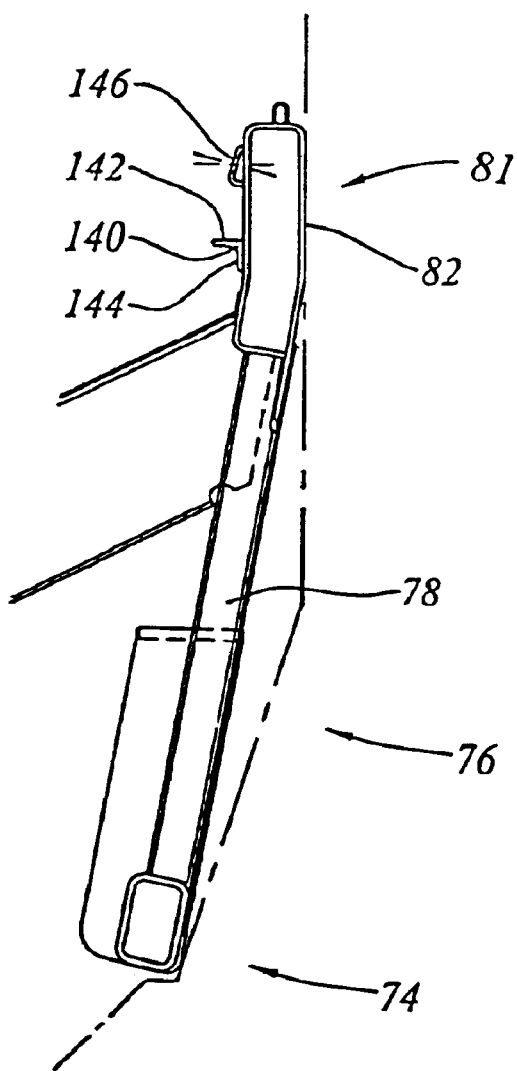
FIG. 11 is a cross-sectional view of another embodiment of a side beam of the coil car of FIG. 1 at mid-span, showing both the weight bearing member and a portion of a securement member.

In another embodiment as shown in FIG. 11, upper flange assembly 80 is replaced by an alternate upper flange assembly 81. Upper flange assembly 81 has the cross-sectional shape of a hollow roll formed section having a dog leg bend to mate with the side sheet, and a horizontal upper flange upon which to seat the cover. Upper flange assembly 81 has a single supporting strip for bearing the weight of the coil stop. An angle iron 140 is welded along the inboard face of the inner web of upper flange assembly 81, to bear the weight of the coil. The same weight bearing surface in the nature of angle iron 140 functions both as a trackway upon which the load bearing component of coil stop 100 travels and a rest platform upon which the stationary coil stop rests.

Referring to FIG. 11, angle iron 140 has an inwardly extending horizontal upper leg 142 and an upright leg 144. Upright leg 144 is welded to the inner web of upper flange assembly 81. When coil stop 100 is being repositioned, rollers 220 travel upon and along the upper surface of horizontal upper leg 142; when coil stop 100 is locked in place, the downwardly facing surface of endplate 120 that is welded to coil stop 100 rests directly upon the same upper surface of horizontal upper leg 142. Looking downward, rollers 220 and endplate 120 to which rollers 220 are connected to do not overlap. Horizontal upper leg 142 has a sufficient width (that is, the length of the leg from the angle to the tip of the toe of horizontal leg 142) to support rollers 220 and endplate 120. Horizontal leg 142 is also sufficiently trimmed back to increase the capacity of the outboard troughs. In the inoperative, normal position, rollers 220 are retracted. In this position, the coil stop, i.e., the downwardly facing surface of end plate 120, rests directly upon angle iron 140. This may tend to prevent the rollers from constantly hammering horizontal leg 142 of angle iron 140, and may thus tend to prolong the life of the rollers and the weight bearing upper surface of horizontal leg 142. Of course, in this single weight bearing surface configuration, alternatives to rollers such as slider 230 or any other resistance reducing device may be used as load bearing component, as noted before.

Figure 12:
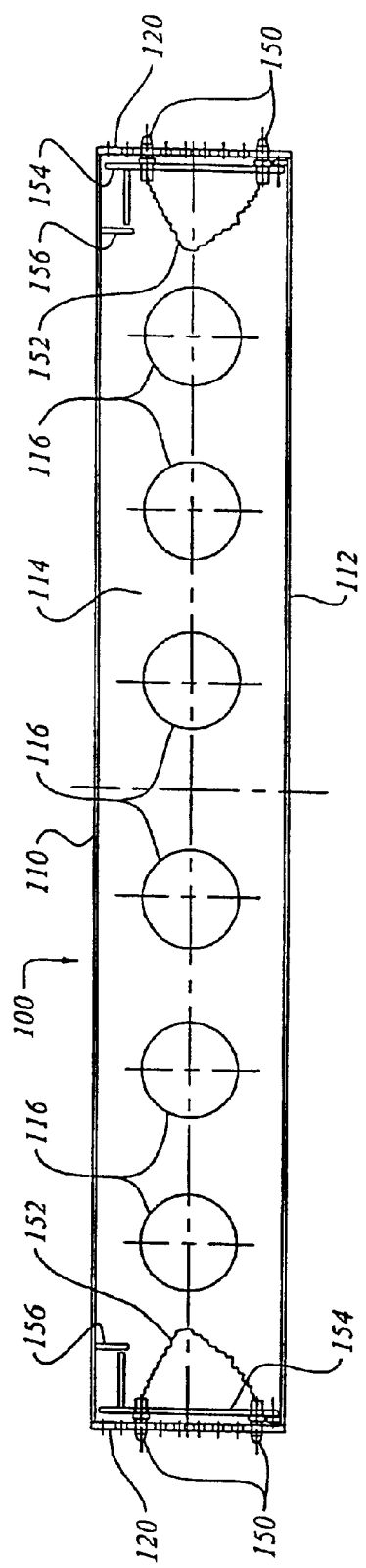
FIG. 12 shows top view of another embodiment of a coil stop, showing a portion of a securement member engagable with the side beam of FIG. 11.

Additionally, a different arrangement of engagement strips, employing horizontal locating pins, may be used. With this arrangement, endplate 120 does not have perforated strips 122, 124 for engaging with perforated upper leg 92 of the upper flange assembly. Instead, end plate 120 has through holes for accommodating releasable retainers in the nature of pins 150. Referring also to FIG. 12, each pair of pins 150 is joined by a lanyard 152. Lanyard 152 is preferably a cable but may also be a wire, cable, chain or strap. Referring to FIG. 11, a perforated formed channel, or strip, 146 is mounted along the face of the inner web of upper flange assembly 81, the perforations serving as sockets for receiving and retaining pins 150.

In use, pins 150 extend through end plate 120 to seat in a pair of apertures, or sockets, in strip 146, thus preventing coil stop 100 from shifting in the fore-and-aft (i.e., longitudinal) direction relative to the trough structure. When so engaged, a locking member 154 pivots on a pin to bear against a shoulder of pins 150, thus preventing them from disengaging from strip 146. Locking member 154 is held in place by a laterally inward retainer 156 that prevents the handle of locking member 154 from moving laterally inboard. To release pins 150, the handle of locking member 154 is pivoted upwards, such that locking member 154 no longer blocks the retraction of the shoulders of pins 150. Pulling on lanyard 152 then releases pins 154, permitting coil stop 100 to be moved to a different location.

In the process of loading a coil, pins 130 or 150 are disengaged from leg 92 or strip 146 and coil stops 100 are urged to positions leaving a long enough space for the coil (or coils, if more than one of the troughs is being used) to be loaded. Each coil is lowered into place, typically by a crane. An operator, pushing handle 202 for placing rollers 220 (or other type of load bearing component) into load bearing position, urges the next adjacent coil stops 100 into position snug against the coil (or coils), or as nearly so as practicable, and the locking members, namely pins 130 or 150 are engaged as shown in FIG. 3 and FIG. 12. Shimming or packing materials are used if required. The movement of coil stop 100 can be either by a single person working in the centre trough, or by two persons cooperating to push on either side from the outer troughs. The next coil, or coils are placed in position, and further coil stops are moved into position, and so on.

Several preferred embodiments have been described in detail and a number of alternatives have been considered. As changes in or additions to the above described embodiments may be made without departing from the nature, spirit or scope of the invention, the invention is not to be limited by or to those details, but only by the appended claims.

We claim:

1. A coil stop for a railroad coil car, the coil car having a trough structure in which to carry coils, the trough structure having two sides and a longitudinal dimension, the coil stop having a weight, wherein said coil stop comprises:

a first member for blocking motion of the coils;

said first member being repositionable along said trough structure;

a releasable securement fitting connected to said first member, said securement fitting being operable to locate said first member relative to the trough structure;

at least one transport fitting connected to said first member, said transport fitting being movable between a first position and a second position relative to said first member;

in said first position said transport fitting engaging the trough structure and supporting a greater portion of said weight of said coil stop than in said second position; and in said first position of said transport fitting said first member having less resistance to longitudinal motion relative to the trough structure than when said transport fitting is in said second position.

2. The coil stop of claim 1, wherein:

said transport fitting includes a load bearing member of load bearing members selected from the group consisting of a roller, a slider, a wheel with a bearing, and a ball caster;

said load bearing member is connected to said first member and is moveable between a first position corresponding to the first position of said transport fitting and a second position corresponding to the second position of said transport fitting; and said load bearing member is operable to travel along the trough structure and bears a greater portion of the weight of said coil stop in said first position than in said second position.

3. A coil stop according to claim 2 wherein said load bearing member is a slider.

4. A coil stop according to claim 2 wherein said load bearing member is a roller.

5. A coil stop according to claim 2 wherein said load bearing member is disengaged from the trough structure in said second position.

6. A coil stop according to claim 2, said transport fitting further including:

a cam movably mounted to said first member;

an actuator mechanically connected to move said cam;

a cam follower mounted to said first member at a pivot point, said cam follower being operable to engage said cam and to pivot about said pivot point;

an arm connecting said cam follower and said load bearing member;

said actuator being operable to move said cam; and said cam follower being driven by said actuator to urge said load bearing member to move toward said first position.

7. The coil stop or claim 6, wherein said transport fitting further includes:
a shaft having a first end and a second end, said shaft being mounted to said first member, said first end having said cam attached thereto; and
said actuator is a handle fixed to said shaft, said handle being operable to rotate said shaft to urge said load bearing member to move toward said first position.

8. A coil stop according to claim 7, wherein said first member includes a beam member for spanning the trough structure, said beam member having a first end, a second end, and a medial portion extending between said first and second ends of said beam member; and a step is mounted to said medial portion of said beam member between said first and second ends of said beam member to facilitate climbing of said coil stop.

9. A coil stop according to claim 8 wherein said step includes a tread plate mounted upon said medial portion of said beam member.

10. A coil stop according to claim 8 wherein a hand grab is mounted to said medial portion of said beam member adjacent to said step.

11. A coil stop according to claim 10 wherein said hand grab is said handle fixed to said shaft.

12. A coil stop according to claim 8 wherein a pair of first and second hand grabs are mounted to either side of said step.

13. A coil stop according to claim 1, wherein said at least one transport fitting is biased by gravity toward said second position.

14. A coil stop according to claim 1, wherein said at least one transport fitting includes a spring biasing said transport fitting toward the second position.

15. A coil stop according to claim 1, wherein said securement fitting includes at least one indexing member mounted to said first member, said indexing member being engageable to maintain said coil stop in a fixed position relative to the trough structure.

16. A coil stop according to claim 1, wherein:
said first member spans the trough structure;
said first member has a first end and a second end; and
said first end has a first transport fitting and said second end has a second transport fitting connected thereto.

17. A coil stop for a railroad coil car, the coil car having a trough structure in which to carry coils, the trough structure having two sides and a longitudinal dimension, said coil stop having a weight, said coil step comprising:
a first member for blocking motion of the coils along the trough structure;
said first member being mounted spanwise relative to the trough structure;
said first member being repositionable along the trough structure;
a releasable securement fitting connected to said first member, operable to locate said first member relative to the trough structure;
at least one transport fitting connected to said first member, said transport fitting including a roller connected to said first member, said roller being movable between a first position and a second position relative to said first member;
in said first position said roller being operable to ride longitudinally on the trough structure; and
said roller supporting a greater portion of the weight of said first member when in said first position than when in said second position.

18. A coil stop according to claim 17, wherein:
said first member spanning the trough structure has a first end and a second end; and
said first end has a first transport fitting and a first securement fitting connected thereto and said second end has a second transport fitting and a second securement fitting connected thereto.

19. A coil stop according to claim 17, said transport fitting further including:
a cam movably mounted to said first member;
an actuator mechanically connected to move said cam;
a cam follower mounted to said first member at a pivot point, said cam follower being operable to engage said cam and to pivot about said pivot point;
an arm connecting said cam follower and said roller;
said actuator being operable to move said cam; and
said cam follower being driven by said actuator to urge said roller to move toward said first position.

20. A coil stop according to claim 19, said transport fitting further including:
a shaft having a first end and a second end, said shaft being mounted to said first member, said first end of said shaft having said cam attached thereto; and
said actuator is a handle fixed to said shaft, said handle being operable to rotate said shaft to urge said roller to move toward said first position.

21. A coil stop according to claim 20, wherein;
said first member includes a beam member for spanning the trough structure, said beam member having a first end, a second end, and a medial portion extending between said first and second ends of said beam member; and
a step is mounted to said medial portion of said beam member between said first and second ends of said beam member to facilitate climbing over said coil stop.

22. A coil stop according to claim 21 wherein said step includes a tread plate mounted upon said medial portion of said beam member.

23. A coil stop according to claim 21 wherein a hand grab is mounted to said medial portion of said beam member adjacent to said step.

24. A coil atop according to claim 23 wherein said hand grab is said handle fixed to said shaft.

25. A coil stop according to claim 21 wherein a pair of first and second hand grabs are mounted to either side of said step.

26. A coil stop for use in a rail road coil car, the rail road car having a trough structure for carrying coils, the trough structure being supported by rail car trucks for rolling motion along a rail road track, the coil stop being for mounting across the trough structure, wherein said coil stop includes a transport fitting movably mounted thereto, said movable transport fitting being operable to engage the trough structure and to facilitate repositioning of the coil stop along the trough structure; and transport fitting including retractable rollers, said rollers being movable to engage said trough structure.

27. The coil stop of claim 26 wherein said coil slop has an actuator connected to said rollers, said actuator being operable to place said rollers in a first position in which said rollers engage said trough structure.

28. The coil stop of claim 27 wherein said rollers are biased away from said first position.

29. The coil stop of claim 28 wherein said rollers are biased by gravity.

30. The coil stop of claim 26 wherein said coil stop has a releasable securement fitting operable to locate said coil stop in a fixed position relative to said trough structure.

31. The coil stop of claim 26 wherein said coil stop has a mid-span handle connected to move said retractable rollers to an engaged position relative to said trough structure.

32. The coil stop of claim 31 wherein said coil stop has a step mounted thereon.

33. The coil stop of claim 32 wherein said step is mounted adjacent to said handle.

34. A coil stop for use in a rail road coil car, the rail road car having a trough structure for carrying coils, the trough structure being supported by rail car trucks for rolling motion along a rail road track, the coil stop being for mounting across the trough structure, wherein said coil stop has a transport fitting operable to engage the trough structure, said transport fitting being movably mounted to the coil stop, said transport fitting being movable between a first condition and a second condition relative to said coil stop, in said second condition said transport fitting bearing more weight of the coil stop than in said first condition and, in said second condition said transport fitting being operable to facilitate repositioning of the coil stop along the trough structure.

35. A combination of a rail road coil car and a coil stop for use therewith, and wherein:
    said coil car has a trough structure in which to carry coils, said trough structure having a first side, a second side and a longitudinal dimension;
    said coil stop has a first member mounted in a spanning position relative to said trough structure, for blocking motion of the coils along the trough structure;
    said first member being repositionable along said trough structure;
    a securement fitting operable to locate said first member relative to said structure;
    a track mounted to said trough structure, said track extending along said trough structure;
    a track following member connected to said first member;
    said track following member being operable to ride on said track;
    said track following member being movable between a first position and a second position relative to said first member;
    said track following member supporting a greater portion of the weight of said first member when said track following member is in said first position than when said track following member is in said second position; and
    in said first position of said track following member said coil stop having less resistance to motion along said trough structure than when said track following member is in said second position.

36. A coil stop in combination with a railroad coil car according to claim 35 said coil stop further including:
    a cam movably mounted to said first member;
    an actuator mechanically connected to move said cam;
    a cam follower mounted to said first member at a pivot point, said cam follower being operable to engage said cam and to pivot about said pivot point;
    an arm connecting said cam follower and said track following member;
    said actuator being operable to move said cam; and
    said cam follower being driveable by said actuator to urge said track following member to move toward said first position.

37. A coil stop in combination with a railroad coil car according to claim 36, said coil stop further including:
    a shaft having a first end and a second end, said shaft being mounted to said first member, said first end having said cam attached thereto; and
    said actuator is a handle fixed to said shaft, said handle being operable to rotate said shaft to urge said track following member to move toward said first position.

38. A combination of a rail road coil car and a coil stop for use therewith, said coil stop having a weight and wherein:
    said coil car has a trough structure in which to carry coils, the trough structure having a first side, a second side and a longitudinal dimension;
    said coil stop has a beam member spanning the trough structure; the coil stop is repositionable along the trough structure to obstruct motion of coils along the trough structure;
    said beam member has a first end, a second end, and a medial portion between said first and second ends;
    a first trackway is mounted on the first side of the trough structure and a second trackway mounted on the second side of the trough structure for guiding the repositioning of said coil stop;
    a first pair of rollers is connected to the first end of said beam member, the first pair of rollers is movable between a first position and a second position relative to said first trackway;
    in said first position said first pair of rollers is operable to travel along said first trackway and to bear a greater portion of weight of said beam member than when said first pair of rollers is in said second position;
    a second pair of rollers is connected to the second end of said beam member;
    the second pair of rollers is movable relative to said second trackway between a first position corresponding to said first position of said first pair of rollers and a second position corresponding to said second position of said first pair of rollers;
    in said first position of said second pair of rollers said second pair of rollers is being operable to travel along said second trackway and to bear a greater portion of weight of said beam member than in said second position of said second pair of rollers;
    a shaft having a first end and a second end, said shaft extending between the first and second ends of said beam member, said shaft being rotatably mounted to said beam member;
    a first cam attached to said first end of said shaft and a second cam attached to said second end of said shaft;
    a first pair of cam followers mounted to said beam member and operable to engage said first cam and a second pair of cam followers mounted to said beam member and operable to engage said second cam;
    a first pair of arms connecting said first pair of cam followers to said first pair of rollers, said first pair or arms being operable to urge said first pair of rollers to move between said first and second positions thereof, and a second pair of arms connecting said second pair of cam followers to said second pair of rollers, said second pair of arms being operable to urge said second pair of rollers to move between said first and second positions thereof;
    a handle fixed to said shaft, said handle being operable to rotate said shaft to urge said rollers to move between their respective first and second positions; and a pair of first indexing members mounted to the first and second ends of said beam member and a pair of second indexing members mounted to the first and second sides of the trough structure, said first and second pairs of indexing members being cooperable to maintain said beam member in a fixed position relative to the trough structure.

39. The combination according to claim 38, the combination further including a step mounted on said medial portion of said beam member between said first and second ends or said beam member, whereby to facilitate climbing over said beam member.

* * * * *

UNITED STATES PATENT AND TRADEMARK OFFICE
CERTIFICATE OF CORRECTION

PATENT NO. : 6,749,381 B2  
DATED : June 15, 2004  
INVENTOR(S) : Ilario A. Coslovi et al.

Page 1 of 1

It is certified that error appears in the above-identified patent and that said Letters Patent is hereby corrected as shown below:

<u>Column 16,</u>
Line 57, insert -- said -- before "transport".

Signed and Sealed this

Fifteenth Day of November, 2005

JON W. DUDAS
*Director of the United States Patent and Trademark Office*